US007890571B1

United States Patent
Kriegsman et al.

(10) Patent No.: US 7,890,571 B1
(45) Date of Patent: Feb. 15, 2011

(54) SERVING DYNAMIC WEB-PAGES

(75) Inventors: Mark E. Kriegsman, Boston, MA (US);
Benjamin W. Wyckoff, Plainville, MA (US)

(73) Assignee: Xcelera Inc., Greenwich, CT (US)

( * ) Notice: Subject to any disclaimer, the term of this patent is extended or adjusted under 35 U.S.C. 154(b) by 1613 days.

(21) Appl. No.: 09/668,110

(22) Filed: Sep. 22, 2000

(51) Int. Cl.
*G06F 15/16* (2006.01)

(52) U.S. Cl. .................. 709/203; 709/212; 709/213; 709/217; 709/218

(58) Field of Classification Search ............... 711/141, 711/137, 133; 707/104.1; 717/115; 709/220, 709/213, 203, 212, 217, 218
See application file for complete search history.

(56) References Cited

U.S. PATENT DOCUMENTS

| | | | | |
|---|---|---|---|---|
| 5,870,559 | A * | 2/1999 | Leshem et al. ............... | 709/224 |
| 5,933,837 | A * | 8/1999 | Kung ........................... | 707/201 |
| 6,029,175 | A | 2/2000 | Chow | |
| 6,094,662 | A | 7/2000 | Hawes | |
| 6,256,712 | B1 * | 7/2001 | Challenger et al. ........... | 711/141 |
| 6,337,696 | B1 * | 1/2002 | Lindhorst et al. ............ | 345/763 |
| 6,449,636 | B1 * | 9/2002 | Kredo et al. ................. | 709/206 |
| 6,463,509 | B1 * | 10/2002 | Teoman et al. .............. | 711/137 |
| 6,539,538 | B1 * | 3/2003 | Brewster et al. ............. | 717/115 |
| 6,633,874 | B1 * | 10/2003 | Nusbickel ..................... | 707/10 |
| 6,654,749 | B1 * | 11/2003 | Nashed ......................... | 707/10 |
| 6,662,192 | B1 * | 12/2003 | Rebane ...................... | 707/104.1 |
| 6,799,248 | B2 * | 9/2004 | Scherr ......................... | 711/118 |
| 2004/0230747 | A1 * | 11/2004 | Ims et al. .................... | 711/133 |

FOREIGN PATENT DOCUMENTS

| | | |
|---|---|---|
| CA | 2 240 600 | 12/1999 |
| EP | 1 100 023 | 4/2002 |
| WO | 99/22315 | 5/1999 |
| WO | WO 01/93536 | 12/2001 |

OTHER PUBLICATIONS

Challenger et al., "A Scalable System for Consistently Caching Dynamic Web Data", pp. 294-303, INFOCOM'99, Eighteenth Annual Joint Conference of the IEEE Computer and Communications Societies, New York, Mar. 1999.

Wills et al., "Towards a Better Understanding of Web Resources and Server Responses for Improved Caching", Computer Networks, Elsevier Science Publishers B.V., Amsterdam, NL, vol. 31, 1999, Nr. 11-16, pp. 1231-1243.

Nottingham M., "Optimizing Object Freshness Controls in Web Cache", the 4th International Web Caching Workshop, Online! Mar. 31-Apr. 4, 1999, pp. 1-5.

* cited by examiner

*Primary Examiner*—Djenane M Bayard
(74) *Attorney, Agent, or Firm*—Fish & Richardson P.C.

(57) ABSTRACT

A web-serving system for managing a cache memory having constituent objects of a web-page stored therein includes a cache manager in communication with the cache memory for controlling the content of the cache memory. A programmable script in communication with the cache manager detects the occurrence of a triggering event. In response to the triggering event, the programmable script instructs the cache manager to alter the content of the cache memory.

33 Claims, 1 Drawing Sheet

SERVING DYNAMIC WEB-PAGES

The invention relates to serving dynamic web-pages, and in particular, to the updating of obsolete portions of a dynamic web-page.

BACKGROUND

A dynamic web-page typically includes one or more static objects and one or more dynamic objects. Serving a web-page thus includes assembling these objects and integrating them to form a web-page.

The static objects are those objects that change rarely, if at all. Examples of such objects include company logos or general instructions and forms for ordering merchandise, biographies of key personnel, and general background about the company serving the web-page.

Dynamic objects are those objects that change frequently. For example, a catalog of merchandise may include notice of special sales that must be updated at regular intervals. Stock prices or news items are often updated on a daily basis. In another example, a web-page can include objects that are uniquely associated with a user requesting the web-page. One common example of such an object can be found in web-pages that greet a repeat customer by name. These components must be updated every time a user requests the web-page.

A modern web-serving system is typically a distributed system in which an origin server is in communication with a plurality of caches. Static components of a web-page are typically stored in the caches, whereas dynamic components of the web-page are generated by the origin server. In such a system, the process of assembling a web-page for serving to a customer involves retrieval of a variety of constituent objects from various locations. A distributed web-serving system of this type is advantageous because it frees the origin server from having to provide static objects.

A disadvantage of the foregoing distributed web-serving system is that although dynamic objects need to be periodically updated, they do not always need to be updated each time a request is made. For example, a dynamic object that lists the daily price of various commodities needs to be updated only once a day. A dynamic object that lists available items needs to be updated when the last unit of a particular item has been sold.

The updating of dynamic objects often involves execution of a database query by the origin server. For example, when a customer wishes to view what items are being offered for a special discount, the origin server may need to formulate a database query that not only asks for a list of what items are on sale but also determines the number of such items available for sale.

To further reduce the load on the origin server, it is preferable that these dynamic objects also be cached and that the cache be updated periodically to avoid the serving of obsolete dynamic components. Where the generation of a dynamic object requires execution of a database query that is expected to be common to many requesting users, it is useful to cache the results of that query to avoid having the origin server needlessly re-execute the same query.

Existing cache management software is not capable of gracefully accommodating the caching of dynamic web-pages. The conventional method of managing a cache of dynamic web-pages is to assign to each dynamic object a date on which that object becomes stale and must be updated. A disadvantage of this method is that it assumes that a stale date, which is to some extent arbitrarily assigned, is a definitive indicator of whether a dynamic object needs to updated. In fact, there may be occasions when a dynamic object becomes obsolete long before its stale date. Conversely, there may occasions when a dynamic object remains current long after the stale date.

SUMMARY OF THE INVENTION

A web-serving system according to the invention enables the contents of cache memory to be controlled with greater flexibility by providing a programmable script in communication with a cache manager. Because the script is programmable, it can be customized by a programmer. In particular, the programmable script can be made to detect and respond to a triggering event and to instruct the cache manager to alter the content of cache memory in response to that triggering event.

In one aspect of the invention, the web-serving system also includes a usage-monitor for collecting access-data indicative of the frequency with which a selected web-page is requested. The usage-monitor optionally provides the access-data to the programmable script. The programmable script can use this data to alter the content of cache memory in response to the access-data.

In another aspect of the invention, the web-serving system includes a communication path between the programmable script and an administrator process. This communication path enables the programmable script to receive instructions from the administrator process.

Other features and advantages of the invention will be apparent from the following detailed description, the claims, and the accompanying drawings in which:

DETAILED DESCRIPTION

Figure 1:
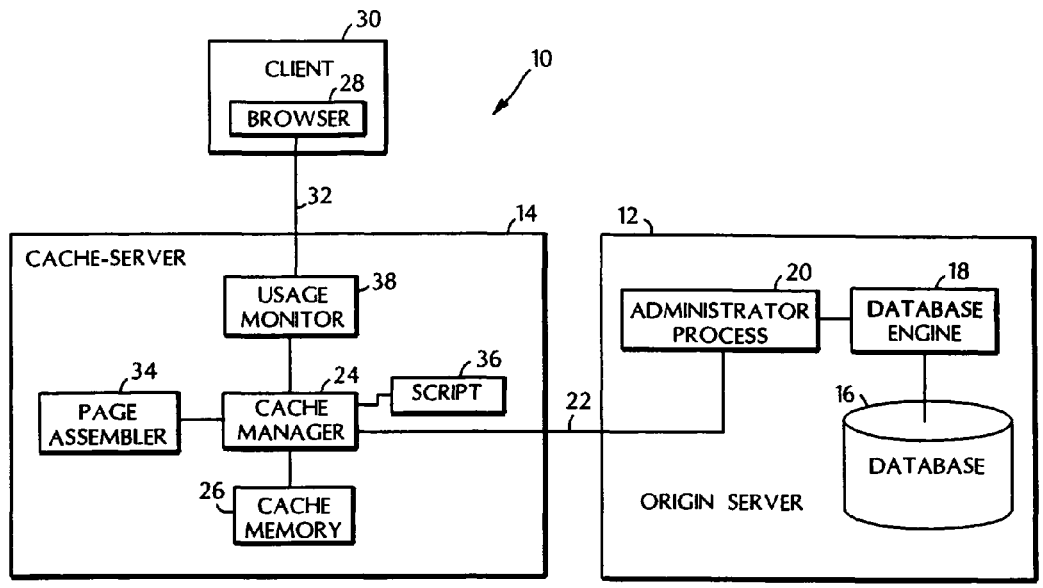
FIG. 1 is a distributed web-serving system incorporating the invention.

A system 10 embodying the invention, as shown in FIG. 1, includes an origin server 12 in communication with a cache server 14 and a database 16. The origin server 12 supports a database engine 18 for formulating and executing database queries in response to instructions issued by an administrator process 20, also supported by the origin server 12. The database 16 stores data that is used to create dynamic web-pages.

For example, if the origin server 12 is associated with a retailer, the database may include current inventory and pricing information, or information regarding weekly specials. The origin server 12 is typically in communication with the cache server 14 over a first interne link 22. Although only a single cache server 14 is shown in FIG. 1, it is understood that the system 10 can include many geographically dispersed cache servers 14.

The cache server 14 supports a cache manager 24 that fetches and stores constituent objects of web-pages in a cache memory 26. These objects are provided to the cache manager 24 by the administrator process 20 running on the origin server 12. When necessary, the administrator process 20 provides replacement web-page objects to the cache manager 24, which then replaces corresponding obsolete objects that are resident in the cache memory 26.

A browser 28 executing on a client machine 30 typically requests web-pages from a web site served by the origin server 12. In a distributed web-serving system 10, the browser's requests are automatically redirected to an available cache server 14 such as that shown in FIG. 1. The browser thus establishes communication with the cache manager 24 over a second internet link 32, as shown in FIG. 1.

In response to the request for a web-page, the cache manager 24 identifies the constituent objects of the web-page and where they are stored. Some of those objects are already available in the cache memory 26. Under these circumstances, the cache manager 24 fetches these objects from the cache memory 26 and provides them to a page assembler 34 for inclusion in the web-page.

Other constituent objects of the web-page are not available from the cache memory 26. For these missing objects, the cache manager 24 issues a request to the administrator process 20 on the origin server 12. In response, the administrator process 20 prepares the missing objects, if necessary, and provides them to the cache manager 24. The cache manager 24 provides the missing objects to the page assembler, which then completes the web-page and provides the assembled web-page to the cache manager 24 for delivery to the client machine.

The step of requesting missing objects of a web-page is a source of delay in serving clients. It is thus desirable to maintain as much of the web-page in the cache memory 26 as possible. There are two constraints that impose limits on what can be stored in the cache memory 26: the finite capacity of the cache memory 26 and the tendency of objects stored in the cache memory 26 to become obsolete.

Because the cache memory 26 has a limited capacity, it is preferable that only the most frequently requested objects be stored in it. This requires that, at some point, a prediction be made concerning how frequently requested a particular object is expected to be.

In some cases, this prediction is simple. If every web-page contains a graphic image with the company logo, then clearly that component should be stored in cache memory 26.

In other cases, however, the popularity of a web-page may vary depending on unpredictable external events. For example, changes in fashion may gradually make web-pages offering the sale of certain items more popular. The random occurrence of newsworthy events may cause feature articles on previously obscure topics to surge in popularity for a limited, and unpredictable, time.

In addition to its limited capacity, cache memory 26 has limited currency. Unless steps are taken to periodically update cache memory 26, objects stored therein will be served to clients long after they have become obsolete. In some cases, it is possible to replace objects at appropriate times because the nature of those objects renders their obsolescence predictable. For example, an object listing the daily closing price of a stock, by definition, requires daily replacement.

In other cases, however, obsolescence can strike an object at any time, with little or no warning. For example, if an object lists special sale items available at a store, it is entirely possible that the sale will be so successful that inventory of certain popular items will be prematurely depleted. Under these circumstances, the object may become obsolete long before it is scheduled to be updated.

Constituent objects in the cache memory 26 typically carry information specifying a date and time on which they should be replaced. In such cases, the cache manager 24 need only monitor the time and transmit a request for an updated web-page at the appropriate time. This is a disadvantage because, as noted above, an object may need to be replaced prematurely, either because an unpredictable event occurred or because an event occurred at an unpredictable time. Since the conventional cache manager 24 will only replace a web-page on its designated date, the premature replacement of a web-page is difficult.

To address the foregoing disadvantages, a system 10 according to the invention provides communication between the cache manager 24 and a programmable script 36. The programmable script 36 can be a set of JavaScript instructions provided by a programmer. The script 36 can thus cause the cache manager 24 to update selected constituent objects of a web page upon the occurrence of a programmer-defined triggering event. One such triggering event can, of course, be the passage of a selected amount of time. However, because the script 36 is freely programmable, the triggering event can be any event that can be defined by the script 36. For example, if more than five clients order the same item, the script 36 can issue a request for an update from the origin server 12 even though the designated replacement time for a particular object may not have arrived. The programmable script 36 thus liberates the cache manager 24 from relying solely on the passage of time as a triggering event for replacing constituent objects of web-pages.

If a web-page increases in popularity, or if its popularity exceeds a threshold, it may be preferable to store the constituent objects of that web-page in the cache memory 26 if they are not already there. Conversely, if a particular web-page is decreasing in popularity, or if the popularity of a web-page falls below a threshold, it may be preferable to remove the constituent objects of that web-page from the cache memory 26 to free space for objects associated with more popular web-pages.

To enable it to engage in such adaptive behavior, the web-serving system can further include an optional usage monitor 38 to collect access-data that illuminates the types of web-pages being requested by client machines. With the usage-monitor 38 in place, the cache manager 24 is able to identify trends in the popularity of particular web-pages. If, on the basis of access-data provided by the usage-monitor 38, a script 36 determines that a particular web-page has become, or is about to become more popular, it can instruct the cache manager 24 to request copies of the constituent objects of that web page for storage in the cache memory 26. Conversely, if on the basis of access-data provided by the usage-monitor 38, the script 36 determines that a web-page is no longer as popular as it once was, it can instruct the cache manager 24 to remove the constituent components of that web page from the cache memory 26.

The usage-monitor 38 and the script 36 thus combine to create a feedback control system in which the measured variables are the popularities of particular web-pages and the controlled variables are the locations of constituent objects of various web-pages. The usage-monitor 38 obtains access-data concerning the measured variables and provides them to the script 36, which functions as a controller. On the basis of that access-data, the script 36 causes the cache manager 24 to adaptively manage the contents of the cache memory 26.

The script 36 can also take access-data from the usage-monitor 38 and, instead of acting upon it as described above, it can report that access-data to the administrator process 20. This access-data can then be made available to human analysts who can then propose new rules to be implemented as scripts.

There also exist web-serving systems that are not distributed systems such as that shown in FIG. 1. Such web-serving systems also benefit from having a high-speed cache memory in which frequently requested constituent objects of web-pages are stored for rapid retrieval. A representative web-serving system of this type is shown in FIG. 2.

Figure 2:
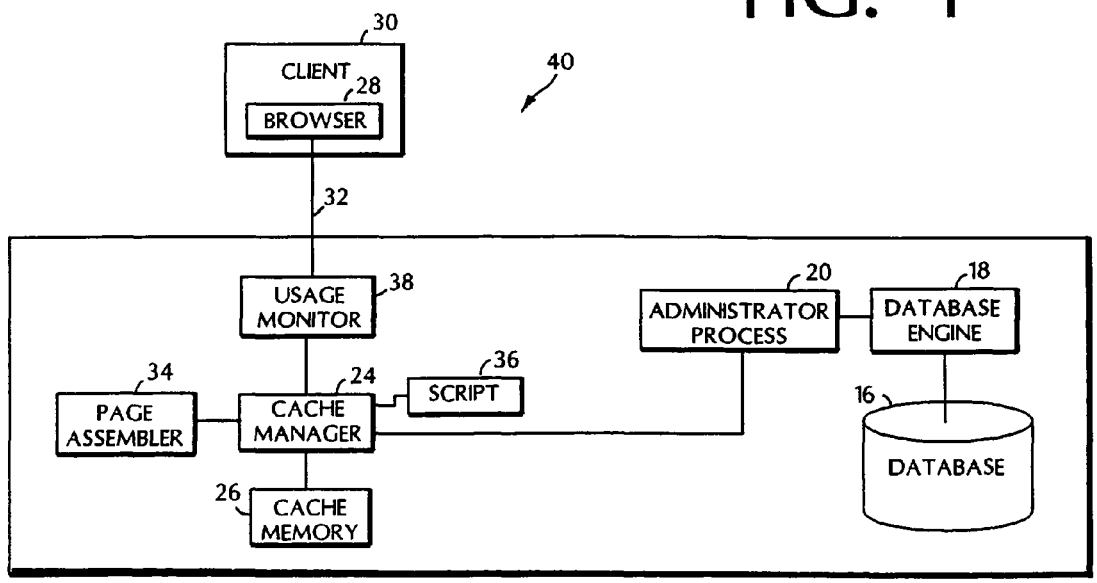
FIG. 2 is a centralized web-serving system also incorporating the invention.

In the web-serving system 40 of FIG. 2, the cache memory 26, the cache manager 24, the usage monitor 38, the page assembler 34, and the script 36, all reside on the origin server 12. In the embodiment of FIG. 2, there is thus no need to redirect requests for web-pages to a cache server because there is no cache server to redirect to. Instead, requests for web-pages are directly intercepted by the usage monitor 38.

The invention can be implemented in hardware or software, or a combination of both. The invention can be implemented in computer programs using standard programming techniques following the method steps and figures described herein. The programs should be designed to execute on programmable computers each comprising a processor, a data storage system (including memory and/or storage elements), at least one input device, and at least one output device, such as a CRT or printer. Program code is applied to input data to perform the functions described herein and generate output information. The output information is applied to one or more output devices such as a CRT, as described herein.

Each program is preferably implemented in a high level procedural or object oriented programming language to communicate with a computer system. However, the programs can be implemented in assembly or machine language, if desired. In any case, the language can be a compiled or interpreted language.

Each such computer program is preferably stored on a storage medium or device (e.g., ROM or magnetic diskette) readable by a general or special purpose programmable computer, for configuring and operating the computer when the storage media or device is read by the computer to perform the procedures described herein. The system can also be considered to be implemented as a computer-readable storage medium, configured with a computer program, where the storage medium so configured causes a computer to operate in a specific and predefined manner to perform the functions described herein.

Having described the invention, and a preferred embodiment thereof, what we claim as new and secured by Letters Patent is:

1. A method for enabling the generation of an updated web-page for storage in one of a plurality of cache servers, said method comprising:
    implementing programmable rules executing on each of the plurality of cache servers, each programmable rule defining a triggering event associated with its corresponding cache server, the occurrence of the triggering event being indicative of the existence of an obsolete portion of said web-page stored in said corresponding cache server;
    detecting an occurrence of a triggering event at a particular cache server selected from the plurality of cache servers;
    in response to the occurrence of said triggering event, causing said particular cache server to request an update of said obsolete portion; and
    receiving an updated portion of said web-page for storage at said particular cache server;
    wherein detecting said triggering event comprises detecting the receipt of an updated portion of said web-page.

2. The method of claim 1, further comprising
    generating a web-page incorporating said updated portion therein; and
    serving said web-page to a user.

3. The method of claim 1, wherein implementing said programmable rules comprises interpreting a script containing instructions for defining a rule.

4. The method of claim 1, wherein requesting an update comprises formulating a database query to be carried out by a database engine.

5. The method of claim 1, wherein
    causing said particular cache-server to request an update comprises establishing communication with an origin server and causing said particular cache server to request said update therefrom, and
    receiving an updated portion comprises receiving said updated portion from said origin server.

6. The method of claim 5, further comprising providing a cache memory element separate from said origin server.

7. The method of claim 5, further comprising providing a cache memory element at said origin server.

8. The method of claim 1, further comprising collecting access-data indicative of how frequently said web-page is requested.

9. The method of claim 8, further comprising managing the content of caches in said cache servers in response to said access-data.

10. A method for enabling the generation of an updated web-page for storage in one of a plurality of cache servers, said method comprising:
    implementing programmable rules executing on each of the plurality of cache servers, each programmable rule defining a triggering event associated with its corresponding cache server, the occurrence of the triggering event being indicative of the existence of an obsolete portion of said web-page stored in said corresponding cache server;
    detecting an occurrence of a triggering event at a particular cache server selected from the plurality of cache servers;
    in response to the occurrence of said triggering event, causing said particular cache server to request an update of said obsolete portion;
    receiving an updated portion of said web-page for storage at said particular cache serve; and
    providing an assembly script containing instructions for assembling constituent portions of a web-page and said updated portion into an updated web-page.

11. The method of claim 10, further comprising
    generating a web-page incorporating said updated portion therein; and
    serving said web-page to a user.

12. The method of claim 10, wherein implementing said programmable rules comprises interpreting a script containing instructions for defining a rule.

13. The method of claim 10, wherein requesting an update comprises formulating a database query to be carried out by a database engine.

14. The method of claim 10, wherein
    causing said particular cache-server to request an update comprises establishing communication with an origin server and causing said particular cache server to request said update therefrom, and
    receiving an updated portion comprises receiving said updated portion from said origin server.

15. The method of claim 14, further comprising providing a cache memory element separate from said origin server.

16. The method of claim 14, further comprising providing a cache memory element at said origin server.

17. The method of claim 10, further comprising collecting access-data indicative of how frequently said web-page is requested.

18. The method of claim 17, further comprising managing the content of caches in said cache servers in response to said access-data.

19. A computer-readable storage medium having encoded thereon software for updating web-pages stored in caches, each cache being associated with a corresponding cache server from a plurality of cache serves, said software comprising instructions for:

implementing programmable rules executing on each of the plurality of cache servers, each programmable rule defining a triggering event associated with its corresponding cache server, the occurrence of the triggering event being indicative of the existence of an obsolete portion of said web-page stored in said corresponding cache server;

detecting an occurrence of a triggering event at a particular cache server selected from the plurality of cache servers;

in response to the occurrence of said triggering event, causing said particular cache server to request an update of said obsolete portion; and receiving an updated portion of said web-page for storage at said particular cache server;

wherein said instructions for detecting said triggering event comprise instructions detecting the receipt of an updated portion of said web-page.

20. The computer-readable medium of claim 19, wherein said software further comprises instructions for:

generating a web-page incorporating said updated portion therein; and serving said web-page to a user.

21. The computer-readable medium of claim 19, said instructions for implementing said first programmable rule further comprise instructions for interpreting a script containing instructions for defining a first programmable rule.

22. The computer-readable medium of claim 19, wherein said instructions for requesting an updated portion of said web page comprise instructions for formulating a database query to be carried out by a database engine.

23. The computer-readable storage medium of claim 19, wherein said instructions for causing said particular cache server to request an update comprise instructions for establishing communication with an origin server and requesting said update therefrom, and said instructions for causing said particular cache server to receive an updated portion comprise instructions for receiving said updated portion from said origin server.

24. The computer-readable storage medium of claim 19, wherein said software further comprises instructions for collecting access-data indicative of how frequently said web-page is requested.

25. The computer-readable medium of claim 24, wherein said software further comprises instructions for managing the content of said caches in response to said access-data.

26. A computer-readable storage medium having encoded thereon software for updating web-pages stored in caches, each cache being associated with a corresponding cache server from a plurality of cache serves, said software comprising instructions for:

implementing programmable rules executing on each of the plurality of cache servers, each programmable rule defining a triggering event associated with its corresponding cache server, the occurrence of the triggering event being indicative of the existence of an obsolete portion of said web-page stored in said corresponding cache server;

detecting an occurrence of a triggering event at a particular cache server selected from the plurality of cache servers;

in response to the occurrence of said triggering event, causing said particular cache server to request an update of said obsolete portion;

receiving an updated portion of said web-page for storage at said particular cache server; and assembling constituent portions of a web-page and said updated portion into an updated web-page.

27. The computer-readable storage medium of claim 23, wherein said software further comprises instructions for:

generating a web-page incorporating said updated portion therein; and serving said web-page to a user.

28. The computer-readable storage medium of claim 23, said instructions for implementing said programmable rules further comprise instructions for interpreting scripts containing instructions for defining the programmable rules.

29. The computer-readable storage medium of claim 23, wherein said instructions for detecting said triggering event comprise instructions detecting the receipt of an updated portion of said web-page.

30. The computer-readable storage medium of claim 23, wherein said instructions for requesting an updated portion of said web page comprise instructions for formulating a database query to be carried out by a database engine.

31. The computer-readable storage medium of claim 23, wherein said instructions for causing said particular cache server to request an update comprise instructions for establishing communication with an origin server and requesting said update therefrom, and said instructions for causing said particular cache server to receive an updated portion comprise instructions for receiving said updated portion from said origin server.

32. The computer-readable storage medium of claim 23, wherein said software further comprises instructions for collecting access-data indicative of how frequently said web-page is requested.

33. The computer-readable storage medium of claim 32, wherein said software further comprises instructions for managing the content of said caches in response to said access-data.

* * * * *

UNITED STATES PATENT AND TRADEMARK OFFICE
CERTIFICATE OF CORRECTION

| | | |
|---|---|---|
| PATENT NO. | : 7,890,571 B1 | Page 1 of 1 |
| APPLICATION NO. | : 09/668110 | |
| DATED | : February 15, 2011 | |
| INVENTOR(S) | : Mark E. Kriegsman et al. | |

It is certified that error appears in the above-identified patent and that said Letters Patent is hereby corrected as shown below:

Claim 19, Col. 7, line 4, delete "serves," and insert --servers,--.

Claim 26, Col. 8, line 2, delete "serves," and insert --servers.--.

Signed and Sealed this

Fourteenth Day of June, 2011

David J. Kappos
*Director of the United States Patent and Trademark Office*